United States Patent

[11] 3,599,528

| [72] | Inventor | Julian H. Kushnick<br>Brooklyn, N.Y. |
|---|---|---|
| [21] | Appl. No. | 851,807 |
| [22] | Filed | Aug. 21, 1969 |
| [45] | Patented | Aug. 17, 1971 |
| [73] | Assignee | Allied Chemical Corporation<br>New York, N.Y. |

[54] PRESSURE RELIEF BOLT
4 Claims, 8 Drawing Figs.

[52] U.S. Cl. .................................................. 85/62,
 85/1, 285/2, 285/405
[51] Int. Cl. ........................................................ F16b 31/02
[50] Field of Search ........................................... 85/61, 62,
DIG. 1, 1, 1 I, 7; 285/1, 2, 3, 4; 52/98, 99; 137/59,
67, 68; 287/131

[56] References Cited
UNITED STATES PATENTS

| 1,018,741 | 2/1912 | Davis | 85/1 T |
| 1,324,036 | 12/1919 | De Laval | 285/2 |
| 1,495,946 | 5/1924 | Bassett | 285/2 |
| 1,505,508 | 8/1924 | Trager | 85/62 |
| 1,518,595 | 12/1924 | Mauran | 137/68 |
| 2,565,547 | 8/1951 | Collins | 285/3 |
| 2,620,832 | 12/1952 | Alix et al. | 85/7 |
| 3,119,298 | 1/1964 | Brown | 85/1 |
| 3,349,531 | 10/1967 | Watson | 52/98 |

FOREIGN PATENTS

| 613,258 | 4/1926 | France | 285/2 |

*Primary Examiner*—Marion Parsons, Jr.
*Attorney*—Jonathan Plaut

ABSTRACT: A bolt with annular collar slidably mounted upon the shank and retained in place by means of a shearpin passing through the collar and shank. When the tensile load on the bolt exceeds the design limit of the pin, the pin will shear and the collar will slide up against the bolthead, thereby relieving the pressure causing the excessive tensile load while all components remain captive.

PATENTED AUG 17 1971
3,599,528
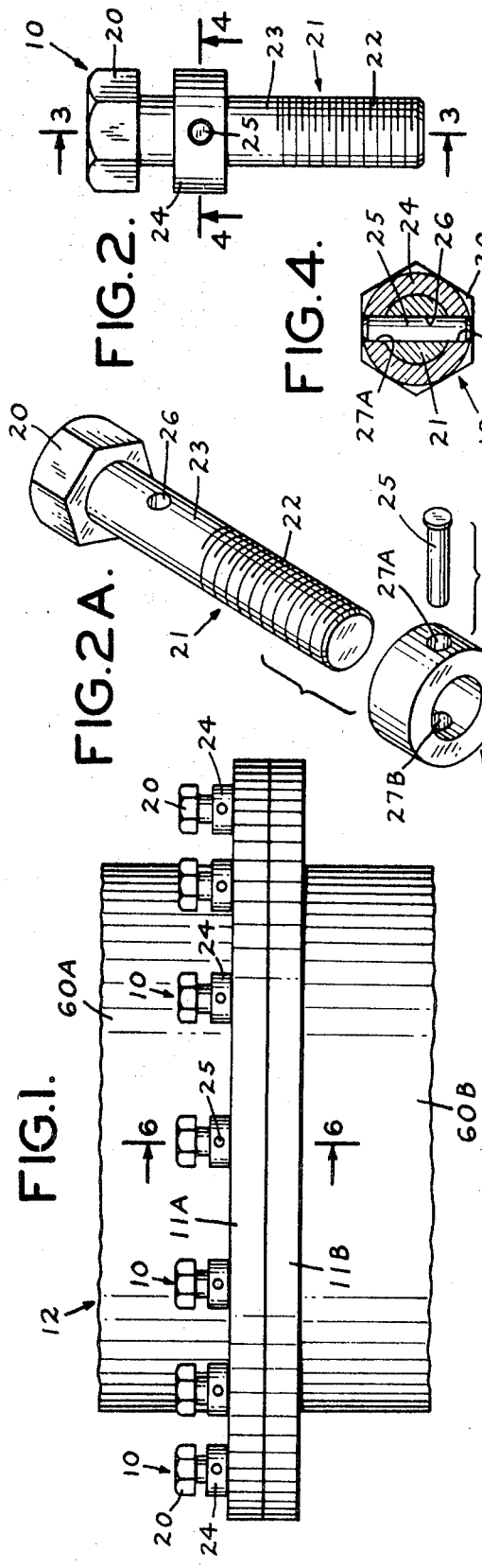
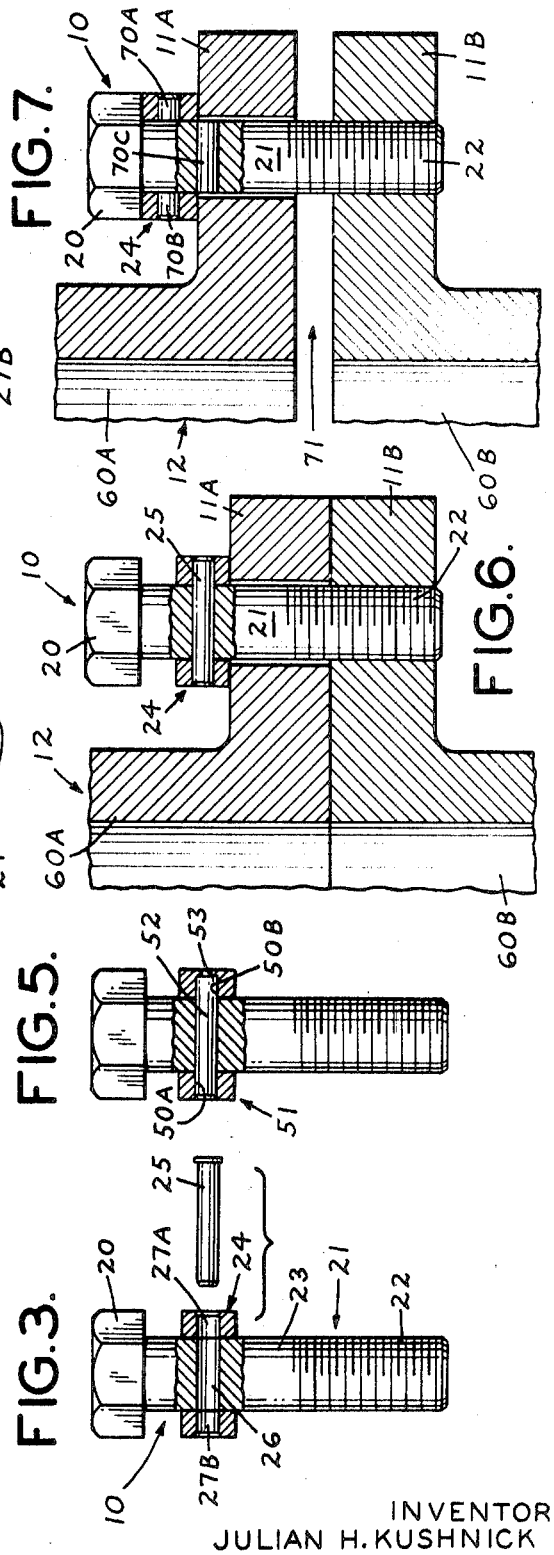
INVENTOR
JULIAN H. KUSHNICK
BY
David J. Brody
AGENT

PRESSURE RELIEF BOLT

BACKGROUND OF THE INVENTION

This invention relates to a pressure relief bolt and in particular to a pressure relief bolt including a shearpin collar.

In many instances where objects are secured together against an opposing force, it is desirable to provide a means of relieving the opposing pressure when it reaches a dangerous or predetermined level. For example, when pressure vessels, fluid conduits, extrusion apparatus or other articles subject to internal pressure are assembled, it is necessary to provide some means of relief of excessive internal pressure in order to protect against dangerous failures of equipment. In this regard, when the articles are secured together by means of bolts, various bolt designs have been developed which will fail at a predetermined pressure to permit separation of the articles and relief of the pressure, e.g., designs including eyebolt and shearpin gate retainer bolt combinations and head clamp shearpin joints. However, these devices have not been entirely satisfactory in that they are often relatively complex and result in complete separation of the assembled articles and occasional ejection of a part at high speed, thereby often resulting in damage to the articles and injury to personnel and nearby equipment. The pressure relief bolts of U.S. Pat. Nos. 1,495,946 and 2,165,656, each of which is provided with a shearpin, suffer from these disadvantages. For this reason, there has been a need for a pressure relief bolt which will relieve excessive pressures while keeping all components of the bolt and secured assembly captive.

BRIEF SUMMARY OF THE INVENTION

It has now been found that a pressure relief bolt, which includes a bolthead and a shank dependent therefrom the distal segment of which is threaded, can be readily provided by slidably mounting an annular collar upon the proximal unthreaded segment of said shank positioned about a bore passing transversely into said shank and in spaced relation with respect to said bolthead, with said collar having a cavity on the inner surface thereof aligned with said bore. By inserting in said bore a shearpin which extends into the cavity, the collar is retained from sliding along the shank and the bolt can then be utilized to secure objects together against an opposing force. When the force exceeds the design limit of the shearpin, the pin will fail and the collar will slide along the shank up against the bolt head, thereby relieving the pressure while keeping all components captive.

BRIEF DESCRIPTION OF THE DRAWINGS

For a better understanding of the instant invention, reference is made to the accompanying drawings, wherein:

FIG. 1 illustrates a portion of an assembly the components of which are secured together by means of the pressure relief bolt of the instant invention;

FIG. 2 is an elevated view of one embodiment of the pressure relief bolt of the instant invention;

FIG. 2A is an exploded view of the embodiment of FIG. 2;

FIG. 3 is a cross-sectional view of the embodiment of FIG. 2 along line 3-3 with pin 25 removed;

FIG. 4 is a cross-sectional view of the embodiment of FIG. 2 along line 4-4;

FIG. 5 is a cross-sectional view of a second embodiment of the pressure relief bolt of the instant invention;

FIG. 6 is a sectional view of a portion of the assembly of FIG. 1 along line 6-6;

FIG. 7 illustrates the sectional view of FIG. 6 after relief of pressure in the manner of the instant invention.

DETAILED DESCRIPTION OF THE INVENTION

The instant invention provides a device which secures together objects against an opposing force which relieves an excessive opposing force while keeping the secured objects and components of said device captive. In FIG. 1, the use of these devices is illustrated, where bolts 10 hold together the mating flanges 11A and 11B of the separable halves of pressure vessel 12. Bolt 10, further illustrated in FIG. 2, includes bolthead 20 and shank 21 dependent therefrom, with shank 21 being divided into distal segment 22 which is threaded and proximal segment 23 which is unthreaded. Annular collar 24 is mounted upon proximal segment 23 of shank 21, with shearpin 25 retaining it in place. With reference to FIG. 2A, an exploded view of bolt 10 of FIG. 2, proximal segment 23 of shank 21 has bore 26 passing transversely therethrough, and collar 24 has a pair of opposing cavities 27A and 27B which are aligned with the ends of bore 26. Shearpin 25 passes through cavities 27A and 27B and bore 26 to retain collar 24 in place on shank 21. FIG. 3, a cross-sectional view of bolt 10 of FIG. 2 along line 3-3 with shearpin 25 removed, shows the alignment of cavities 27A and 27B with bore 26 when collar 24 is in position on shank 21. FIG. 4 is cross-sectional view of bolt 10 of FIG. 2 along line 4-4, wherein shearpin 25 passes through collar 24 and shank 21 to retain the former in place, with the ends of pin 25 peened.

FIG. 5 is a cross-sectional view of a second embodiment of the instant invention wherein cavity 50A extends through the wall of annular collar 51 and cavity 50B extends only partially therethrough, thereby facilitating proper positioning of pin 52. In order to facilitate removal of the pin from cavity 50B, hole 53 is provided.

FIGS. 6 and 7 are sectional views of a portion of pressure vessel 12 of FIG. 1, illustrating the assembly before and after attainment of a predetermined internal pressure within vessel 12. With reference to FIG. 6, separable halves 60A and 60B of vessel 12 are secured together by means of bolt 10 passing through holes in mating flanges 11A and 11B. Shank 21 is extended through an unthreaded hole in flange 11A and distal threaded segment 22 is screwed into a threaded hole in flange 11B, thereby bringing collar 24, which is retained in place by shearpin 25, up tight against flange 11A and securing the vessel halves together. When the internal pressure in vessel 12 exceeds the design limit of shearpin 25, the resulting opposing force between flanges 11A and 11B will shearpin 25 into three segments 70A, 70B and 70C, as illustrated in FIG. 7, which conform respectively to cavities 27A and 27B and bore 26. Collar 24 will then slide up against bolthead 20 under the influence of the opposing force, permitting the internal pressure to be relieved through space 71 between flanges 11A and 11B while maintaining all components of the assembly captive.

In practicing the instant invention, a conventional bolt which includes a bolthead and a shank dependent therefrom, the distal segment of which is threaded, is modified in the manner described herein to provide the desired advantages. Normally, the shank is passed through an unthreaded hole in the first object to be secured, which is therefore free to slide along the unthreaded proximal segment of the shank, and then the distal end of the shank is screwed into a threaded hole in the second object to be secured in order to draw the entire assembly up tight against the bolthead. According to the instant invention, however, the assembly is drawn up tight against an annular collar mounted upon the shank by means of a shearpin in spaced relation with respect to the bolthead. Thus when the opposing force between the two objects exceeds the design limit of the shearpin, the pin will fail and the collar and first object will slide along the shank until stopped by the bolthead, thereby relieving the force.

For the purposes of this invention it is possible to employ a bolt having a shank which is threaded along its full length and not just on the distal segment in the manner described hereinbefore. However, if a fully threaded shank is employed it is necessary that said first secured object and the annular collar each have sufficient clearance from the shank that they are capable of sliding along the shank in spite of the thread on the proximal segment.

In mounting the collar upon the shank, it is necessary that the collar be able to slide along the shank and that it be mounted in spaced relation with respect to the bolthead. The distance between the mounted collar and bolthead is not critical but will vary with the individual device according to the amount of movement desired upon failure of the shearpin. Also the closeness of fit of the collar upon the shank is not critical so long as the collar can slide along the shank and be stopped by the bolthead. Quite often a relatively close fit will be desirable, with the inner diameter of the collar only slightly in excess of the diameter of the shank.

The collar is kept in position upon the shank by means of a shearpin which passes from the shank into the collar. Thus, the shank must be provided with a transverse bore and the inner surface of the collar with a cavity, which is aligned with the bore, to receive the pin. In a preferred embodiment, the cavity will extend through the wall of the collar to facilitate insertion and removal of the shearpin. However, it is not essential that the cavity extend in this manner if alternate means for insertion and removal of the pin is provided. It is also preferred that the cavity be cylindrical in configuration with a diameter substantially equal to that of the bore. In this way the collar can be positioned upon the shank more securely and accurately, thereby permitting use of the device in applications requiring relatively close tolerances and precise adjustments.

The number and depth of the combination of bore and cavity are not critical and may vary with the force at which it is desired the collar to shift in position. Thus, there may be a single bore-cavity combination with a single shearpin therewithin, or there may be a plurality of such combinations about the circumference of the shank. In a preferred embodiment of the instant invention, there will be a plurality of such combinations located about the circumference of the shank in a manner to distribute the force evenly thereabout. In a more preferred embodiment, this plurality will be provided by a single bore passing transversely through the shank and a pair of opposing cavities on the inner surface of the collar, respectively aligned with the two ends of the bore. Thus, by inserting a single shearpin which will pass from one cavity through the bore into the opposing cavity, a plurality of such combinations is provided which distribute the force evenly about the shank. It is preferred that at least one of the cavities in the pair extend through the wall of the collar to facilitate insertion and removal of the shearpin, and more preferable that both cavities so extend.

The shearpins used in the instant invention are of conventional design, having the necessary length and diameter to be inserted in the bore and cavity and retain the collar in position upon the shank. It is an advantage of the instant invention that upon failure of the shearpin at the predetermined force, the segments of the broken pin can be removed from the bolt and new one inserted for reuse of the device. This feature is particularly important when relatively large and expensive bolts are used, in which event loss of the entire bolt upon each failure would result in a substantial economic burden.

The following example is provided to illustrate the instant invention more fully. It is provided for illustrative purposes only and is not to be construed as limiting the invention, which is defined in the appended claims. It will be clear to those with skill in the art that variations and alterations can be made in the example without departing from the scope of the invention.

EXAMPLE

A 5 inch long 1-inch diameter conventional, steel machine bolt ⅜the type illustrated in FIG. 2 is provided with a ⅜-inch diameter bore extending transversely therethrough 1 inch below the bolthead. A hollow cylindrical collar, 1 inch long and having one-half inch wall thickness and inside diameter of 1 inch (0.001 inch greater than the outside diameter of the bolt), is similarly provided with ⅜-inch cavities as illustrated in FIG. 3. The collar is mounted upon the bolt using a shearpin of ⅜-inch diameter hardened steel dowel having a total shear strength of 33,000 pounds. Eight of these modified bolts are used to secure a die adapter to the flange of a 4½-inch plastic film extruder. The bolts are tightened to 2,000 inch pounds torque to place a 10,000 pound preload on each shearpin. During operation of the extruder, an internal pressure within the extruder of 11,500 p.s.i. will place an additional 23,000 pound load on each of the shearpins causing them to fail, in which event the collar will slide along the bolt until stopped by the bolthead, thereby permitting the die adapter to become spaced from the extruder flange to relieve the internal pressure while maintaining all parts of the assembly captive.

What I claim is:

1. In a bolt which includes a bolthead and shank dependent therefrom the distal segment of which is threaded, the improvement which comprises:
    an annular collar slidably mounted upon the proximal unthreaded segment of said shank, positioned about a bore passing transversely into said shank and in spaced relation with respect to said bolthead, said collar having a cylindrical cavity extending through a wall thereof, said cavity having a diameter substantially equal to the diameter of said bore, and
    a shearpin inserted in said bore and extending into said cavity, thereby retaining said collar from sliding along said shank.

2. The improved bolt of claim 1 wherein said bore extends through said shank and said collar has a pair of opposing cavities extending therethrough aligned with said bore.

3. In the method of securing objects together against an opposing force by means of a bolt which includes a bolthead and a shank dependent therefrom the distal segment of which is threaded, the improvement which comprises:
    providing the proximal unthreaded segment of said shank with a bore passing transversely thereinto:
    providing an annular collar slidably mounted upon the proximal segment of said shank and positioned about said bore and in spaced relation with respect to said bolthead, extending a cylindrical cavity through a wall of said collar on the inner surface thereof aligned with said bore, said cavity, having a diameter substantially equal to the diameter of said bore; and providing a shearpin in said bore which extends into said cavity, thereby restraining said collar from sliding along said shank.

4. The improved method of claim 3 wherein said bore extends through said shank and said collar has a pair of opposing cavities extending therethrough aligned with said bore.